(No Model.)
W. E. SMITH.
BUCKLE.
No. 450,110. Patented Apr. 7, 1891.
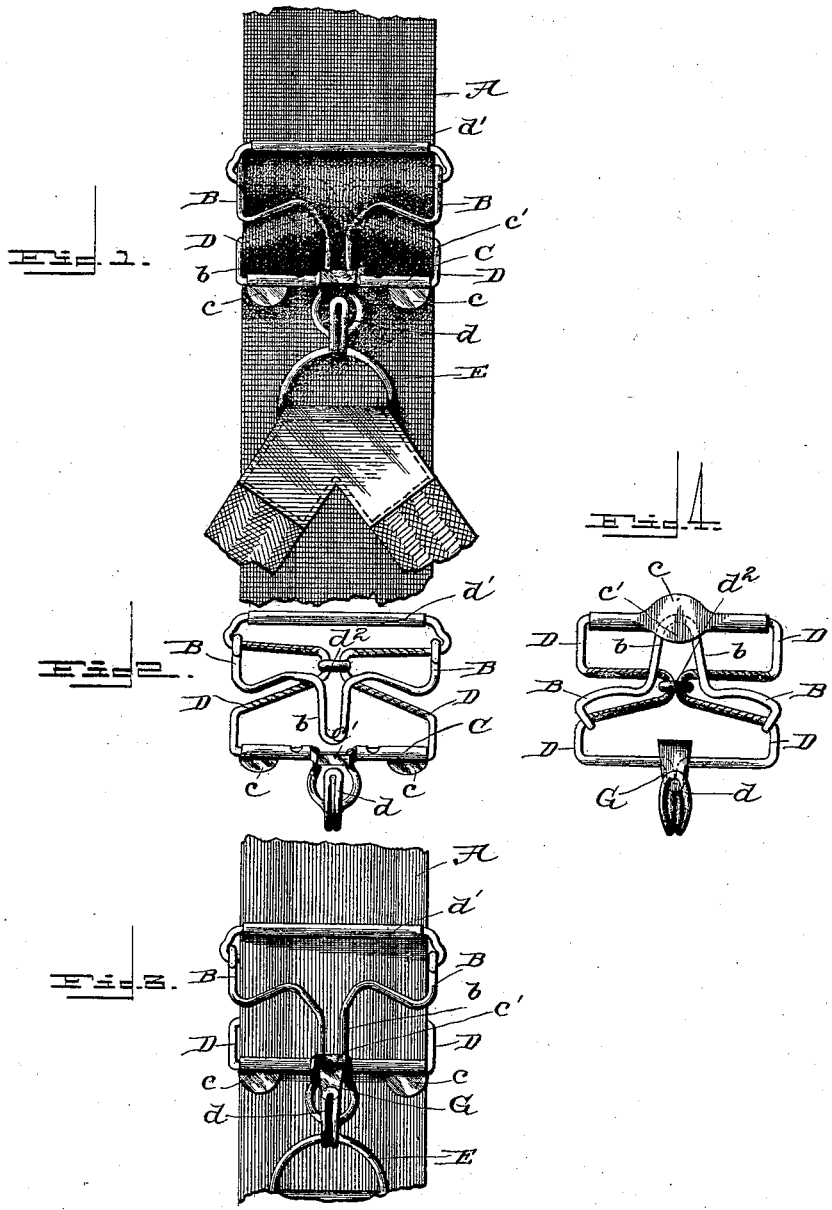
WITNESSES:
INVENTOR,
William E. Smith

UNITED STATES PATENT OFFICE.

JOHN C. SELLERS, OF HUSBAND, PENNSYLVANIA, ASSIGNOR OF ONE-HALF TO ABRAHAM WELLER, OF SAME PLACE.

HAY-RACK.

SPECIFICATION forming part of Letters Patent No. 450,109, dated April 7, 1891.

Application filed August 21, 1890. Serial No. 362,701. (No model.)

*To all whom it may concern:*

Be it known that I, JOHN C. SELLERS, a citizen of the United States, residing at Husband, in the county of Somerset and State of Pennsylvania, have invented certain new and useful Improvements in Hay Racks or Ladders, of which the following is a specification.

This invention relates to certain new and useful improvements in the construction of hay racks or ladders, as will enable them to be supported upon the trucks of ordinary wagon-bodies, and also permit the front trucks turning in a complete circle under the rack or ladder.

In the drawings, Figure 1 is a bottom plan view, and Fig. 2 a side elevation, of my device.

In the said drawings, the numerals 1 and 2 represent the longitudinal beams of the rack or ladder, and 3 the vertical side supports connecting and bracing said beams.

4 is a bolster for centrally carrying the fifth-wheel 5, rigidly attached thereto, and 6 is a cross-bar on the rack for supporting the rear end of said fifth-wheel. This fifth-wheel is adapted to rest upon the front truck of an ordinary wagon, and may rotate either upon the other half of a fifth-wheel on said truck or upon the ordinary bolster on the top of the axle. A suitable king-bolt passes centrally through the aperture 7 in the bolster 4 and connects the parts in the usual manner. At a point immediately in rear of said fifth-wheel and in proper relation thereto the lower longitudinal bars 1 are divided and united by the inverted-U-shaped brackets 8 bolted thereto, thereby forming the transverse arch through the rack or ladder, as clearly shown in Fig. 2.

In the bottom of the body of the rack or ladder, and on top of the cross-bars 9, 10, and 11, are located the slats 12, extending longitudinally thereof and terminating at their front ends on the foremost cross-bar 11, immediately in rear of the arched portion of the rack or ladder. In order to form a substitute for said longitudinal slats 12 over the arched portion, I provide the cross-bars 13, bolted to the brackets 8, as shown, thereby completing a continuous bottom for the rack and preventing the hay from being forced into the arched portion and clogging or hindering the turning of the front wheels. The rear bottom cross-bar 9 of the rack or ladder is adapted to abut against the rear side of the bolster of an ordinary rear wagon-truck. The intermediate cross-bar 10 is adapted to receive a connecting-bolt passing therethrough and through the reach of the rear wagon-truck.

By means of the fifth-wheel 5 for the front truck and the connections above described for the rear truck the coupling-pole ordinarily employed in wagons is dispensed with, the connection between the front and rear trucks being maintained through the rack or ladder itself. An obvious advantage of this is that when using the above-described rack or ladder with ordinary wagon-trucks there will be no coupling-pole to interfere with the complete rotation of the front truck on the fifth-wheel.

What I claim is—

1. A hay rack or ladder having a transverse arched portion near its front end, a fifth-wheel in front of said arch, and cross-bars in rear of the arch, said rack adapted to rest upon ordinary wagon-trucks and form the connection between them, substantially as described.

2. A hay rack or ladder having a transverse arched portion near its front end, the fifth-wheel 5 in front of said arch, supported by the bolster 4 and cross-bar 6, the rear cross-bar 9, and the intermediate apertured cross-bar 10, all operating substantially as described.

JOHN C. SELLERS.

Witnesses:
JAS. B. TREDWELL,
VALENTINE HAY.